US010359313B1

(12) United States Patent
Rudder et al.

(10) Patent No.: US 10,359,313 B1
(45) Date of Patent: Jul. 23, 2019

(54) DUAL WAVELENGTH RAMAN PROBE WITH SPECTRAL CONCATENATION OF DATA

(71) Applicant: Innovative Phototonic Solutions, Monmouth Junction, NJ (US)

(72) Inventors: Scott L. Rudder, Hopewell, NJ (US); Joseph B. Gannon, Brick, NJ (US); Robert V. Chimenti, Runnemede, NJ (US); Benjamin L. Carlin, Pennington, NJ (US); John C. Connolly, Clarksburg, NJ (US)

(73) Assignee: Innovative Photonic Solutions, Inc., Monmouth Junction, NJ (US)

( * ) Notice: Subject to any disclaimer, the term of this patent is extended or adjusted under 35 U.S.C. 154(b) by 0 days.

(21) Appl. No.: 15/997,614

(22) Filed: Jun. 4, 2018

Related U.S. Application Data

(60) Provisional application No. 62/589,489, filed on Nov. 21, 2017.

(51) Int. Cl.
*G01J 3/44* (2006.01)
*G01J 3/10* (2006.01)
*G01J 3/02* (2006.01)

(52) U.S. Cl.
CPC .......... *G01J 3/10* (2013.01); *G01J 3/021* (2013.01); *G01J 3/0208* (2013.01); *G01J 3/0218* (2013.01); *G01J 3/0229* (2013.01); *G01J 3/0256* (2013.01); *G01J 3/44* (2013.01); *G01J 2003/106* (2013.01)

(58) Field of Classification Search
CPC ........ G01J 3/02; G01J 3/10; G01J 3/44; G01J 3/28; G01J 3/30; G01N 21/25; G01N 21/65; G01N 21/64; G01N 21/00; G01N 21/55; G01N 21/26; H01S 3/04
See application file for complete search history.

(56) References Cited

U.S. PATENT DOCUMENTS

| | | | |
|---|---|---|---|
| 4,464,762 A | 8/1984 | Furuya | |
| 4,573,761 A | 3/1986 | McLachlan | |
| 4,833,684 A | 5/1989 | Krekels | |
| 5,112,127 A | 5/1992 | Carrabba | |
| 2013/0271760 A1 | 10/2013 | Froigneux | |
| 2014/0072004 A1 | 3/2014 | Connolly | |
| 2016/0202124 A1* | 7/2016 | Lambert | G01J 3/44 356/301 |

* cited by examiner

*Primary Examiner* — Abdullahi Nur
(74) *Attorney, Agent, or Firm* — Law Office of Carl Giordano, PC

(57) ABSTRACT

A compact dual-wavelength Raman probe using two laser sources each providing Raman excitation light at a different wavelength is disclosed causing Raman scattering in a fingerprint region associated with one excitation wavelength and causing Raman scattering in a stretch region, which are detected by the same detector array.

26 Claims, 14 Drawing Sheets

Stokes

| $\lambda_p$ (μm) | 0.680 | 0.785 |
|---|---|---|
| $\nu$ (cm$^{-1}$) | $\lambda_s$ | $\lambda_s$ |
| 20 | 0.681 | 0.786 |
| 40 | 0.682 | 0.787 |
| 100 | 0.685 | 0.791 |
| 250 | 0.692 | 0.801 |
| 500 | 0.704 | 0.817 |
| 750 | 0.717 | 0.834 |
| 1000 | 0.730 | 0.852 |
| 1250 | 0.743 | 0.870 |
| 1500 | 0.757 | 0.890 |
| 1750 | 0.772 | 0.910 |
| 2000 | 0.787 | 0.931 |
| 2250 | 0.803 | 0.953 |
| 2500 | 0.819 | 0.977 |
| 2750 | 0.836 | 1.001 |
| 3000 | 0.854 | 1.027 |
| 3250 | 0.873 | 1.054 |
| 3500 | 0.892 | 1.082 |
| 3750 | 0.913 | 1.112 |
| 4000 | 0.934 | 1.144 |

Stokes

| $\lambda_p(\mu m)$ | 0.680 | 0.785 |
|---|---|---|
| $v\ (cm^{-1})$ | $\lambda_s$ | $\lambda_s$ |
| 20 | 0.681 | 0.786 |
| 40 | 0.682 | 0.787 |
| 100 | 0.685 | 0.791 |
| 250 | 0.692 | 0.801 |
| 500 | 0.704 | 0.817 |
| 750 | 0.717 | 0.834 |
| 1000 | 0.730 | 0.852 |
| 1250 | 0.743 | 0.870 |
| 1500 | 0.757 | 0.890 |
| 1750 | 0.772 | 0.910 |
| 2000 | 0.787 | 0.931 |
| 2250 | 0.803 | 0.953 |
| 2500 | 0.819 | 0.977 |
| 2750 | 0.836 | 1.001 |
| 3000 | 0.854 | 1.027 |
| 3250 | 0.873 | 1.054 |
| 3500 | 0.892 | 1.082 |
| 3750 | 0.913 | 1.112 |
| 4000 | 0.934 | 1.144 |

FIG. 4A

Anti-Stokes

| $\lambda_p(\mu m)$ | 0.680 | 0.785 |
|---|---|---|
| $v\ (cm^{-1})$ | $\lambda_s$ | $\lambda_s$ |
| 20 | 0.679 | 0.784 |
| 40 | 0.678 | 0.783 |
| 100 | 0.675 | 0.779 |
| 250 | 0.669 | 0.770 |
| 500 | 0.658 | 0.755 |
| 750 | 0.647 | 0.741 |
| 1000 | 0.637 | 0.728 |
| 1250 | 0.627 | 0.715 |
| 1500 | 0.617 | 0.702 |
| 1750 | 0.608 | 0.690 |
| 2000 | 0.599 | 0.678 |
| 2250 | 0.590 | 0.667 |
| 2500 | 0.581 | 0.656 |
| 2750 | 0.573 | 0.646 |
| 3000 | 0.565 | 0.635 |
| 3250 | 0.557 | 0.625 |
| 3500 | 0.549 | 0.616 |
| 3750 | 0.542 | 0.606 |
| 4000 | 0.535 | 0.597 |

FIG. 4B

DUAL WAVELENGTH RAMAN PROBE WITH SPECTRAL CONCATENATION OF DATA

CLAIM OF PRIORITY

This application claims, pursuant to 35 USC 119, priority to, and the benefit of the earlier filing date of provisional patent application afforded Ser. No. 62/589,489, filed on Nov. 21, 2017, the contents of which are incorporated by reference herein.

FIELD OF THE INVENTION

This invention relates to the field of spectroscopy and more particularly to a compact Raman spectroscopy probe and method for providing a wide spectral range of data.

BACKGROUND OF THE INVENTION

Raman spectroscopy is a well-known technique that can be used to observe vibrational, rotational and other low-frequency modes in molecules. Raman scattering is an inelastic process whereby monochromatic light, typically provided by a laser, interacts with molecular vibrations, phonons or other excitations resulting in the energy of the laser photons being shifted up or down. Due to conservation of energy the emitted photon gains or loses energy equal to energy of the vibrational state.

Many Raman measurements suffer from fluorescence, which forces usage of longer wavelength (lower energy) excitation lasers to mitigate against the fluorescent signal overwhelming the Raman signal, thereby making the latter impossible to extract. Usage of longer excitation wavelengths facilitates extraction of Raman signals from fluorescent samples but, in systems of prior art, at the cost of reduced sensitivity in the silicon CCD detectors that capture spectrometer signals. Often, the longer wavenumber spectral content must be disregarded in order to collect spectral data in the fingerprint region. A reason that 785 nm has become a popular wavelength for exciting Raman spectra is that it offers a reasonable compromise in that the wavelength is sufficiently long so that Raman signals can be extracted from many samples, yet the wavelength is sufficiently short so that most spectrometers can capture the entire fingerprint region. However, usage of 785 nm excitation wavelengths requires integration for extended periods with expensive low-noise spectrometers due to the extremely low quantum efficiency of silicon CCD detectors at wavelengths longer than 935 nm, which corresponds to long wavenumbers for Raman excitation at that wavelength.

Capture of Raman spectra covering the entire range of wavenumbers from 0 $cm^{-1}$ to 4000 $cm^{-1}$ can be accomplished by use of (1) a large spectrometer incorporating long sensors to capture photons at all relevant wavenumbers with sufficient resolution or (2) multiple pump sources with separate spectrometers configured to capture multiple Raman spectra, each covering a smaller range of wavenumbers. An example of use of the latter technique is disclosed by Yang Song "Novel Pressure-Induced Molecular Transformations Probed by In Situ Vibrational Spectroscopy", Chapter 8 in "Applications of Molecular Spectroscopy to Current Research in the Chemical and Biological Sciences", Mark T. Stauffer (ed.), Oct. 5, 2016.

The x-axis of these spectra is broken between about 1250 and 2800 $cm^{-1}$ indicating that these scans were obtained using two different spectrometer configurations. The data captured in the two separate ranges are "stitched" or "concatenated" together by use of computer software.

Spectrometers designed for Raman spectroscopy are commercially available. Typically, these devices comprise a slit through which received light passes one or more optical elements (e.g. concave mirrors) to collimate the received light and reflect it so that the received light illuminates a wide area of a diffraction grating or other wavelength-dispersive element. The light from the wavelength-dispersive element is then collected and collimated by additional optics (e.g., a concave mirror) and directed towards an array of detector elements. The detector array may, for example, be a linear array. Because of its position and width, each element of the detector array will detect a relatively narrow band of wavelengths of light, with the wavelengths within each narrow band being incident upon an individual corresponding element of the linear array.

The resolution of a grating spectrometer is determined, in part, by the width of its entrance slit, the number of grating lines illuminated, the dispersion of the grating and optical elements, and the spacing of elements in its detector array and, therefore, is also linked to the size of the spectrometer.

Conventional Raman probes having one or more optical fiber transmission paths often must use fiber optic connectors to couple the scattered light into the probe, resulting in loss of optical signal due to both the connector itself and coupling of the laser source to an internal optical fiber that transmits the excitation light. As a result, the excitation laser used in such Raman probes must either be operated at higher current to maintain the required optical power at the target or the detected Raman signal will suffer power losses.

Capturing a full range of Raman data including the fingerprint and stretch regions may be accomplished by use of large spectrometers having extended detector arrays, but these are costly and unwieldy. An alternate conventional approach of using multiple probe wavelengths requires either use of different spectrometers for each wavelength or changing grating within a single spectrometer to match the pump wavelength to the detector array installed in a single spectrometer. Another approach is to rotate the grating to gain more spectral range if the detector is sensitive at the wavelength of interest.

Hence, there is a need in the industry for a compact Raman probe and spectrometer system that allows multiple spectra covering different ranges of wavenumbers using two or more probe laser wavelengths and a method for concatenating the resultant multiple data sets together to cover the entire Raman spectral range.

SUMMARY OF THE INVENTION

The Raman spectral concatenation concept described herein allows use of a single, relatively compact spectrometer to collect both fingerprint and stretch Raman spectra. The fingerprint spectrum is captured using one excitation wavelength, e.g., 785 nm, and the stretch spectrum using a shorter excitation wavelength, e.g., 680 nm. This not only allows the stretch and fingerprints to substantially coincide on the CCD sensor pixels, but also shifts the entire stretch band to shorter wavelengths into a region of high quantum efficiency of the CCD detector. The increased quantum efficiency can be substantial: for example, increases of in signal strength 100× can be achieved (with no increase in noise) in the water ($H_2O$) band.

A compact dual-wavelength Raman probe configured to provide two separate laser wavelengths to excite Raman scattering from a sample that is compatible with many commercially available fiber optic spectrometers is disclosed. Described herein are embodiments in which two laser sources are integrated within the housing of a Raman probe and embodiments in which two external laser sources are coupled to a compact Raman probe using a guided-light transmission component, such as a multimode optical fiber. These Raman probes provide users with the capability of acquiring Raman spectroscopic data of the highest quality spanning a wide range of wavenumbers at low cost.

In accordance with the principles of the invention, the wavelengths of the probe lasers are selected so that a spectrometer having a single grating coupled to the probe will diffract Stokes- or anti-Stokes shifted Raman signals from each wavelength to be diffracted onto detector elements of a silicon detector array within the spectrometer. This allows use of the probe with a single, compact spectrometer.

While detector arrays made from any of several materials systems can be used, silicon detectors are commonly installed in commercial spectrometers for capturing Raman spectra. However, the responsivity of silicon (Si) detectors diminishes at wavelengths longer than 935 nm with virtually no responsivity beyond about 1040 nm.

In accordance with the principles of the invention, systems and methods described herein enable usage of compact spectrometers that include a single silicon detector array for capture and display of Stokes-shifted Raman data.

In accordance with the principles of the invention, the choice of Raman excitation wavelengths allows shifting both the fingerprint and stretch regions of the Raman spectrum to wavelengths at which silicon detectors have relatively high quantum efficiency.

Raman spectra are captured separately for each of the two pump wavelengths and subsequently concatenated, or stitched together, to provide a single spectral scan encompassing the entire range of data, including the fingerprint and stretch regions.

The compact Raman probe, disclosed herein, may include optics to configure the output beam of each laser source to have an elliptical cross-section, approximating the shape of the elongated emission region of the laser near-field, rather than a circular cross-section. The laser beams are transmitted to a target under investigation and the resultant scattered signal light is transmitted by the compact Raman probe via an optical beam that has a corresponding elliptical cross-section. An optical fiber incorporating a core having dimensions approximating those of the returned scattered light beam, transmits the returned scattered light to the entrance aperture of a spectrometer.

In accordance with the principles of the invention of the dual-wavelength Raman probe disclosed herein, external cavity lasers (ECLs) are integrated into the probe as wavelength-stabilized laser sources.

In accordance with the principles of the invention, the Raman probe disclosed herein incorporates diode laser drive and temperature-stabilization electronics within the probe housing. See, for example, U.S. Pat. No. 9,059,555, "Wavelength-Stabilized Diode Laser", the contents of which are incorporated by reference herein.

In accordance with the principles of the compact Raman probe disclosed herein, a distributed Bragg reflector (DBR) or distributed feedback (DFB) lasers may comprise a wavelength-stabilized laser source.

In accordance with the principles of the compact dual-wavelength Raman probe disclosed herein, the light emitted by a laser may be used as the pump source for a non-linear optical (NLO) conversion to produce a different wavelength, e.g., by second-harmonic generation (SHG), third-harmonic generation (THG), or any other non-linear optical process.

In accordance with the principles of the invention, the power at which the lasers are operated is controllable by a user via an input on the probe housing.

In accordance with the principles of the compact dual-wavelength Raman probe disclosed herein, the laser sources are external to the compact Raman probe. In these embodiments, light is inputted to the compact Raman probe via a guided-light transmission component, such as a multimode fiber.

BRIEF DESCRIPTION OF DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 4A and 4B illustrate the wavelengths of Raman signal light that arise from the (a) Stokes and (b) anti-Stokes processes for both 680 nm and 785 nm probe wavelengths.

It is to be understood that the figures and descriptions of the present invention described herein have been simplified to illustrate the elements that are relevant for a clear understanding of the present invention, while eliminating for purposes of clarity, many other elements. However, because these omitted elements are well-known in the art, and because they do not facilitate a better understanding of the present invention, a discussion of such elements is not provided herein. The disclosure herein is directed also to variations and modifications known to those skilled in the art.

DETAILED DESCRIPTION

Figure 1B:
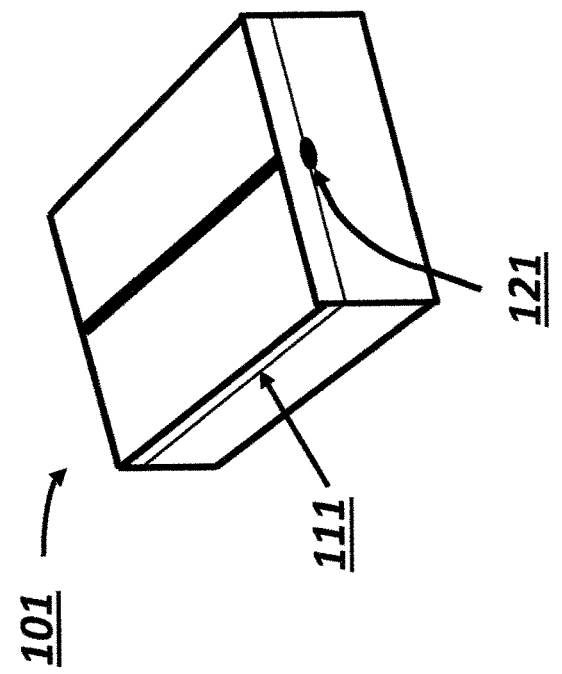
FIGS. 1A and 1B illustrate conventional single-spatial mode diode laser (left) and multiple-spatial mode diode laser (right), respectively.
Figure 1A:
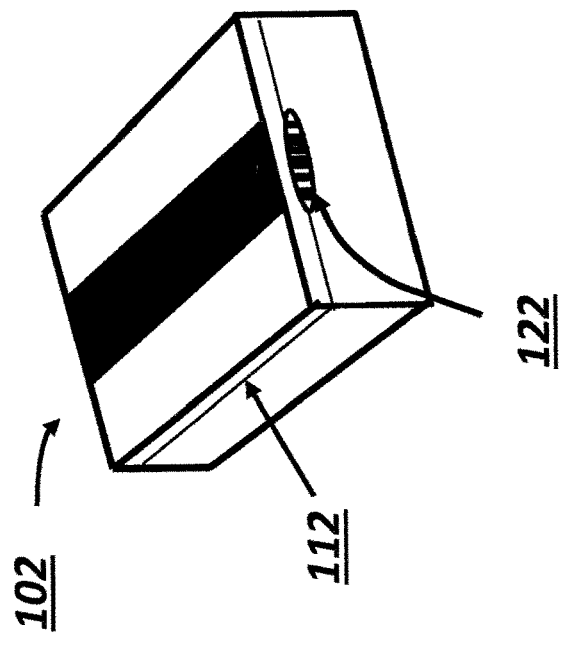

Diode lasers are the most commonly used light sources in Raman spectroscopy. FIGS. 1A and 1B schematically illustrate diode lasers 101 and 102, respectively, configured to emit in a single-spatial mode and multiple-spatial modes, respectively. The active regions of both devices are illustrated by the planes 111 and 112, respectively. The output of these devices is shown as the spatial beam profiles at the output facets 121 and 122 respectively. The near-field output beam profile 121 of the single-spatial mode laser 101 is schematically illustrated as being a well-filled spot; in fact, it has a smoothly varying intensity profile. The near-field output beam profile 122 of the multiple-spatial mode laser 102 is shown as being an irregularly filled spot of longer extent in the direction parallel to the epitaxial layers.

The output of diode lasers having sufficient power density to excite Raman scattering is typically generated from a region approximately 1 μm (1 micron or micrometer in the direction perpendicular to the planes of epitaxial growth of the semiconductor laser material) but which is wider in the orthogonal direction (parallel to the planes of epitaxial growth of the semiconductor laser material). This width may be in the range of 3 μm (for single-spatial mode lasers) to 100 μm or more (for multi-spatial mode lasers). Higher power pump lasers are desirable in Raman spectroscopy as they result in increased Raman signal. Thus, broad-area or wide-stripe multiple-spatial mode lasers are often preferred. The typical shape of the pump light from such a laser when imaged onto a target of interest is elongated. In the perpendicular direction this shape may be Gaussian-like. In the parallel direction the image of the near field of the laser may comprise a Gaussian-like profile for a single-spatial mode laser or an irregular profile for a multi-spectral mode laser. Thus, the illuminated region of the target may have an elongated shape, such as an ellipse or a line, with a ratio of long dimension to short dimension that may vary from approximately 3:1 to greater than 100:1.

While both single-spatial mode and multiple-spatial mode lasers may be used to excite Raman scattering, multiple-mode ("multimode") lasers typically provide greater optical power and will be used herein as an exemplary embodiment without limiting applicability of this disclosure to use of single-mode lasers.

Figure 2:
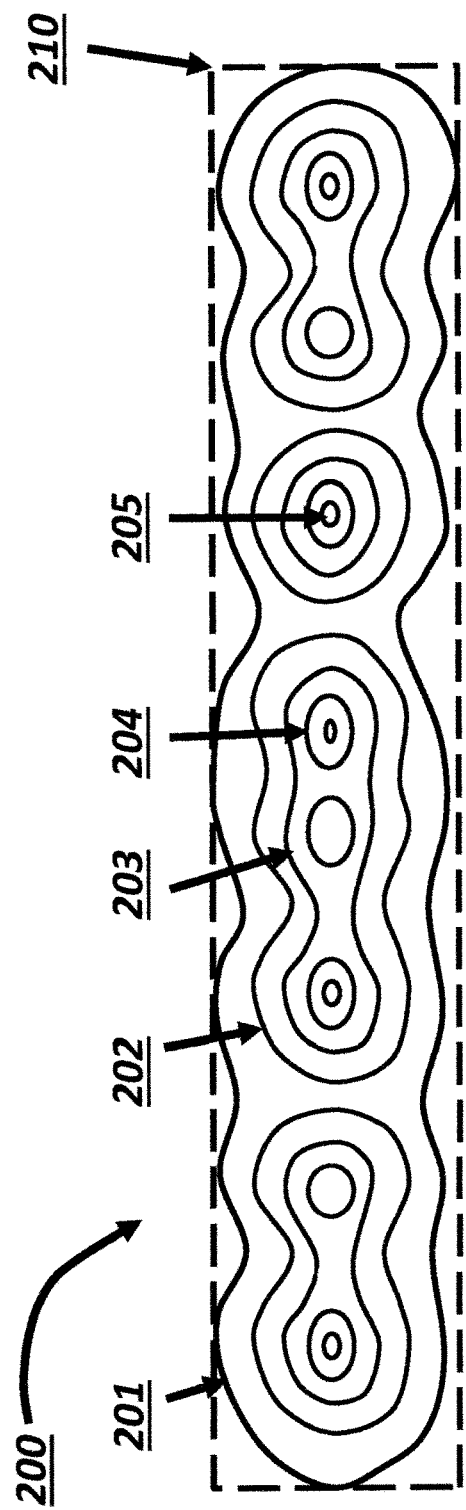
FIG. 2 illustrates the near-field of a multimode laser imaged onto a target from which Raman signals may be detected.

FIG. 2 schematically illustrates contours of pump laser excitation intensity on a target under investigation by Raman spectroscopy. The intensity mapping 200 comprises contours of constant optical pump intensity increasing as shown schematically by contours 201, 202, 203, 204, and 205, all falling within an elongated area, exemplified in the figure by rectangle 210. Alternatively, the elongated area may be approximated by an ellipse, a super-ellipse, or any other regular or irregular elongated shape having a major axis greater than a minor axis.

While the Raman signal is proportional to the intensity of excitation optical power at the target that intensity must be maintained below a level at which the target substance will not be subject to thermal degradation. In many cases, the long dimension of the pump laser light pattern on the target, approximately the horizontal length of the exemplary rectangle 210 is of the order of 100 μm to several times that length, the details determined by the extent of the pump laser output beam on a lens that focusses the pump light onto the target and the focal length and numerical aperture of that focusing target lens.

Exemplary Raman pump wavelengths currently in use are 532 nm, 638 nm, 785 nm, 830 nm, and 1064 nm. As is known in the art, shorter wavelength pump wavelengths yield higher Raman scattered signals as the polarization is proportional to $\lambda^{-4}$. However shorter pump wavelengths are more likely to give rise to fluorescence, which can overwhelm the Raman spectral features.

Further, Stokes spectra are more typically more intense than are anti-Stokes spectra. As is well known in the art, a Stokes shift of ν (measured in wavenumbers, i.e., cm$^{-1}$) will give rise to a Raman signal wavelength, $\lambda_s$, related to the probe wavelength, $\lambda_p$, by:

$$1/\lambda_s = 1/\lambda_p + \nu \quad (1)$$

The "fingerprint" region of the spectrum includes wavenumbers less than about 2000 cm$^{-1}$ whereas the "stretch" region includes wavenumbers ranging from about 2000 cm$^{-1}$ to 4000 cm$^{-1}$.

Figure 3:
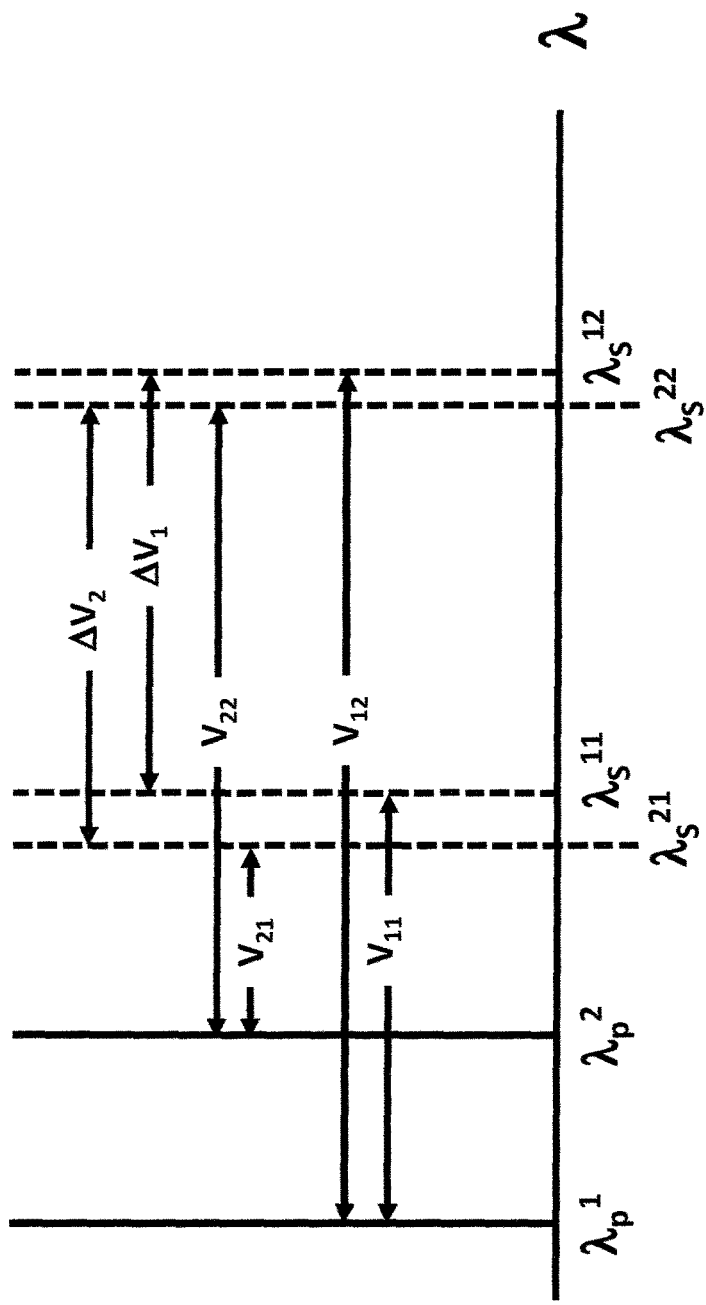
FIG. 3 illustrates fingerprint and stretch regions detected using a single detector array in a compact spectrometer.

FIG. 3 illustrates how the fingerprint and stretch regions of the spectrum may be excited by two separate wavelengths such that the two resultant Stokes signal spectra can be detected using a single detector array in a compact spectrometer. The two probe wavelengths are designated as $\lambda_p^1$ and $\lambda_p^2$, which excite the stretch and fingerprint regions of the Raman spectrum, respectively. The range of fingerprint region wavenumbers is $\Delta\nu_2$, extending from $\nu_{21}$ to $\nu_{22}$ from probe wavelength $\lambda_p^2$, which correspond to wavelengths $\lambda_s^{21}$ and $\lambda_s^{22}$, respectively. Correspondingly, the range of stretch region wavenumbers is $\Delta\nu_1$, extending from $\nu_{11}$ to $\nu_{12}$ from probe wavelength $\lambda_p^1$, which correspond to wavelengths $\lambda_s^{11}$ and $\lambda_s^{12}$, respectively. For the purposes of this invention, the fingerprint region wavenumber range and stretch region wavenumber range are approximately equal, i.e., $\Delta\nu_1 \approx \Delta\nu_2$, resulting in $\lambda_s^{11} \approx \lambda_s^{21}$ and $\lambda_s^{21} \approx \lambda_s^{22}$. Thus, it is possible to capture both the fingerprint and stretch region using the same detector array, one that approximately half the length of a single array that would be needed to capture the entire range of Stokes signals as is conventionally practiced.

The approximate relationships $\lambda_s^{11} \approx \lambda_s^{21}$ and $\lambda_s^{21} \approx \lambda_s^{22}$ may be satisfied when $\Delta\nu_1 \approx \Delta\nu_2$, when $$1/\lambda_p^1 - 1/\lambda_p^2 \approx \Delta\nu \quad (2)$$

where $\Delta v=\Delta v_1=\Delta v_2$, i.e., the fingerprint and stretch region wavenumber ranges are set to be equal.

As Raman spectra typically range over approximately 4000 cm$^{-1}$, the value of $\Delta v=2000$ cm$^{-1}$ is used for the purposes of the following discussion.

The relationship shown in Eq. (2) applies to any pair of probe wavelengths. Implementation of cost-effective systems currently uses diode lasers as probe sources. Several pairs of commercially available diode lasers conform to the approximate relationship of Eq. (2) for $\Delta v=2000$ cm$^{-1}$, including:

638 nm and 730 nm
680 nm and 785 nm
785 nm and 930 nm
808 nm and 970 nm
875 nm and 1064 nm In a preferred embodiment of the dual wavelength Raman probe of this disclosure, the use of 680 nm as one of the two Raman excitation wavelengths has a particular usefulness for Raman concatenation when 785 nm is selected for the other of the two Raman excitation wavelengths FIGS. 4A and 4B illustrate tables showing signal wavelengths arising from both 680 nm and 785 nm excitation light for (a) Stokes-shifted and (b) anti-Stokes-shifted Raman spectra as a function Raman shift, shown in wavenumbers.

Figure 5:
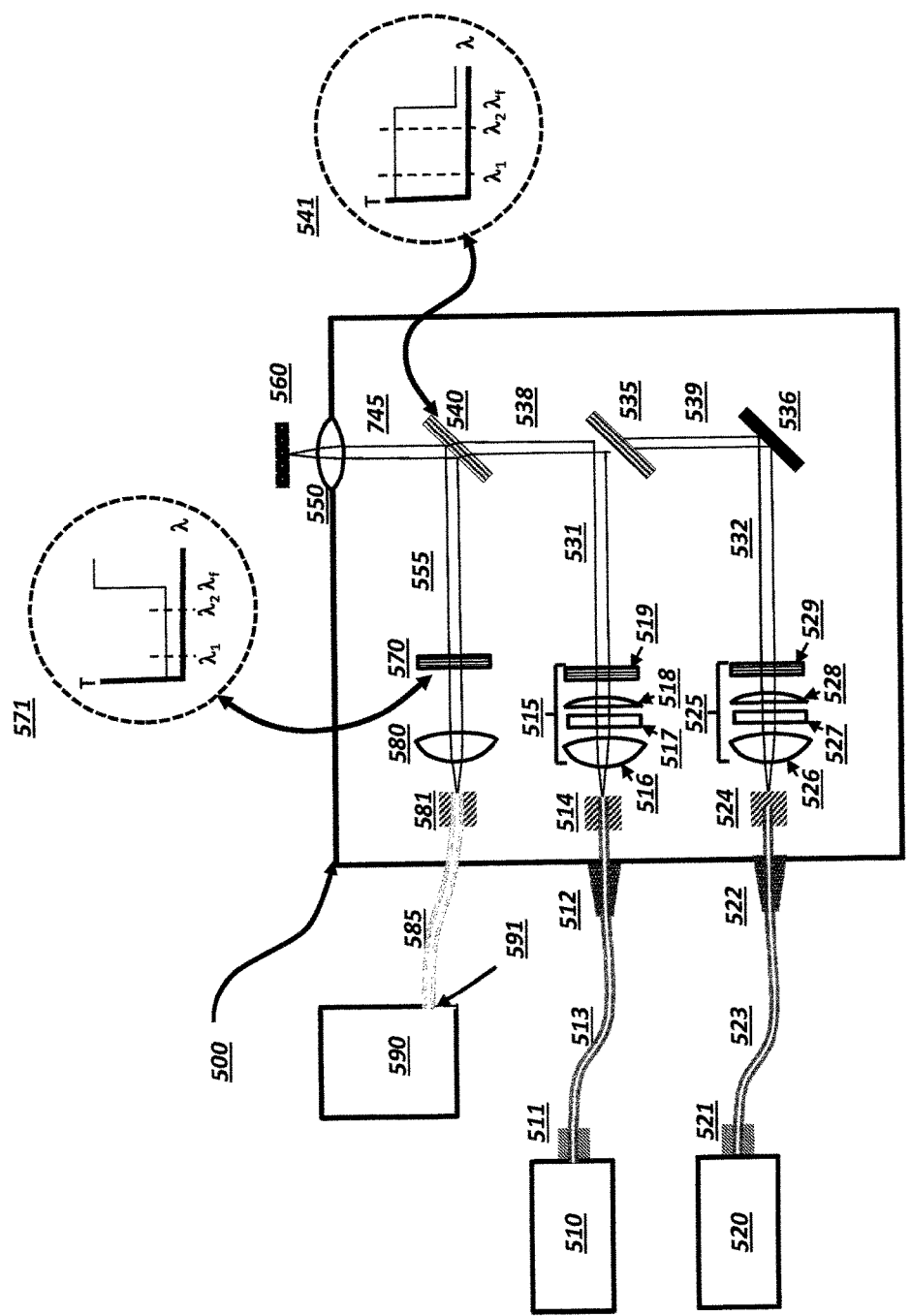
FIG. 5 illustrates a block diagram of an exemplary embodiment of the dual-wavelength Raman probe using external laser sources according to the principles of the invention.

FIG. 5 illustrates a block diagram of an exemplary embodiment of a compact dual-wavelength Raman probe, in accordance with the principles of the invention. As shown, Raman probe includes a housing 500 and two external laser sources 510 and 520, coupled via optical fibers 513 and 523, respectively, to the internal optics within housing 500. The lasers 510 and 520 may emit light in a single spatial mode or in multiple spatial modes. The laser sources 510 and 520 may be any laser device or system; preferably laser sources 510 and 520 are wavelength-stabilized laser sources having narrow bandwidth.

One class of lasers that may be used as a wavelength-stabilized laser source is an external cavity laser. See, for example, U.S. Pat. Nos. 9,059,555 and 9,577,409, the contents of which are incorporated, in their entirety, by reference, herein.

The wavelength-stabilized laser sources may also be semiconductor lasers that incorporate gratings within their structure, such as a distributed feedback (DFB) or distributed Bragg reflector (DBR) laser.

The wavelength-stabilized laser sources 510, 520 may also be a DFB or DBR laser coupled to a non-linear optical element for second- or third-harmonic generation of shorter wavelength laser light, as is well-known in the art.

The compact dual-wavelength Raman probe further includes optics to configure the output beam of the laser sources 510, 520. Exemplary components shown in FIG. 5, are lenses 516, 517, and 518 to reshape the optical beam associated with laser 510, e.g., to form a beam cross-section suitable for exciting Raman signal at a target of interest 560, and corresponding components 526, 527, and 528 to reshape the optical beam associated with laser 520. Narrow-band filters 519 and 529 reject spontaneous emission from the outputs of lasers 510 and 520.

As is shown, collimated light beams 531 and 532 are combined into a single collimated beam 538 by use of a first dichroic mirror 535. The probe light beam 538 is transmitted through a second short-pass dichroic mirror 540 with transmission characteristics schematically depicted in inset 541 to lens 550 which focuses the combined light, comprising two excitation wavelengths, onto the target 560.

Light scattered from the target will include Raman, Rayleigh and fluorescent components, which may be collected by lens 550 and directed back towards the second dichroic mirror 540. Dichroic mirror 540 is configured to reflect the longer Stokes-shifted Raman photons into collimated beam 555. Light at wavelengths longer than the filter cutoff, including at the two excitation wavelengths, will to a great extent pass through second dichroic mirror 540 and be largely eliminated from beam 555.

The spatial extent of the excitation light on the target 560 may be sufficiently long to give rise to off-axis scattered light, which could result in the reflection of a range of wavelengths—including those that would be preferentially excluded—by the second dichroic mirror 540 into beam 555. The design of dichroic mirror 540 must be such that unwanted light is eliminated as much as is possible.

Dichroic mirror 540 may be an edge filter that is designed to direct wavelengths of the Raman scattered light toward spectrometer 590, while substantially removing other light near the pump wavelengths. In an embodiment of the invention disclosed in which the Stokes signal wavelength is to be detected, the dichroic mirror 540 is a short-pass filter that reflects wavelengths longer than that of the pump wavelength and substantially removes wavelengths at and shorter than the pump wavelengths from optical path 555. In an embodiment of the invention disclosed, in which anti-Stokes signals are to be detected, the dichroic mirror 540 is a long-pass filter that reflects wavelengths shorter than that of the pump wavelength and substantially removes wavelengths at and longer than the pump wavelengths from optical path 555.

Dichroic mirror 540 is typically used at a 45° angle of incidence and, in the embodiment shown in FIG. 5, transmits light from the pump laser sources 510 and 520 towards the target 560 under investigation. Exemplary dichroic mirror are Semrock's RAZOREDGE beamsplitters. RAZOREDGE is a registered Trademark of IDEX Health & Science LLC, Rohnert Park, Calif.

For detection of Stokes signals long-pass dichroic filter 570 is designed to transmit wavelengths longer than its cutoff wavelength as shown in inset 571. Lens 580 focuses that light onto the entrance facet of optical fiber 585, which transmits the light to the slit 591 of a compact spectrometer 590.

An overall optical density at the pump laser wavelengths of OD≥8 (a factor of $10^8$) provided by the combination of the dichroic mirror 540 and filter 570 is desirable.

The filter 570 may be one of: a dichroic filter, a volume holographic grating filter, and a fiber Bragg grating filter, used in combination with focusing and collection optics or any filter that provides the required wavelength-dependent blocking and transmitting capabilities. Exemplary filters include STOPUNE® single notch filters and RAZOREDGE® ultra-steep long-pass edge filters for Stokes detection and ultra-steep short-pass edge filter for anti-Stokes detection. STOPUNE and RAZOREDGE are registered Trademarks of IDEX Health & Science LLC, Rohnert Park, Calif.

Figure 7:
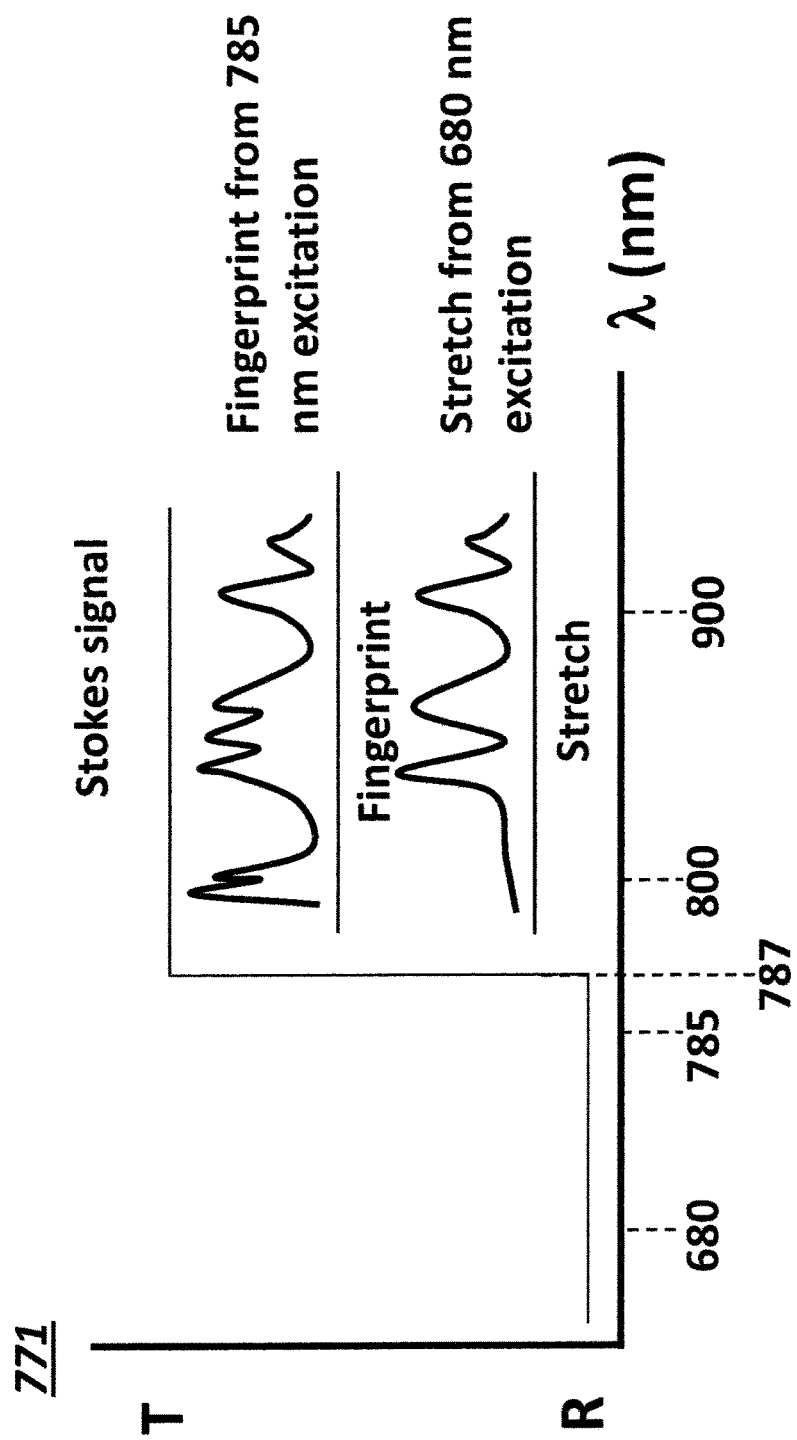
FIG. 7 illustrates the transmission profile of a long-pass filter having a cut-off wavelength of 787 nm and exemplary fingerprint and stretch region Stokes-shifted Raman signal data corresponding to probe wavelengths of 785 nm and 680 nm, respectively, captured by a dual-wavelength Raman probe.

Spectrometer 590 is designed to diffract light input through slit 591 to a linear silicon detector array. The range of light diffracted onto the array is limited by the design of the spectrometer's diffraction grating and linear extent of the detector array as is well-known in the art. As shown in the example of FIG. 7, a spectrometer's grating and detector may be configured so that the detector receives a limited range of wavelengths, e.g., approximately 791 nm to 934 nm for Stokes signals. An exemplary 2048-element linear detector would then have a resolution of approximately 1 cm$^{-1}$ in both the fingerprint and stretch regions of the spectrum if detected separately.

In another embodiment of the invention claimed, the light from lasers 510 and 520 of FIG. 5 may be combined onto a single fiber before being transmitted to dichroic mirror 540.

Figure 6:
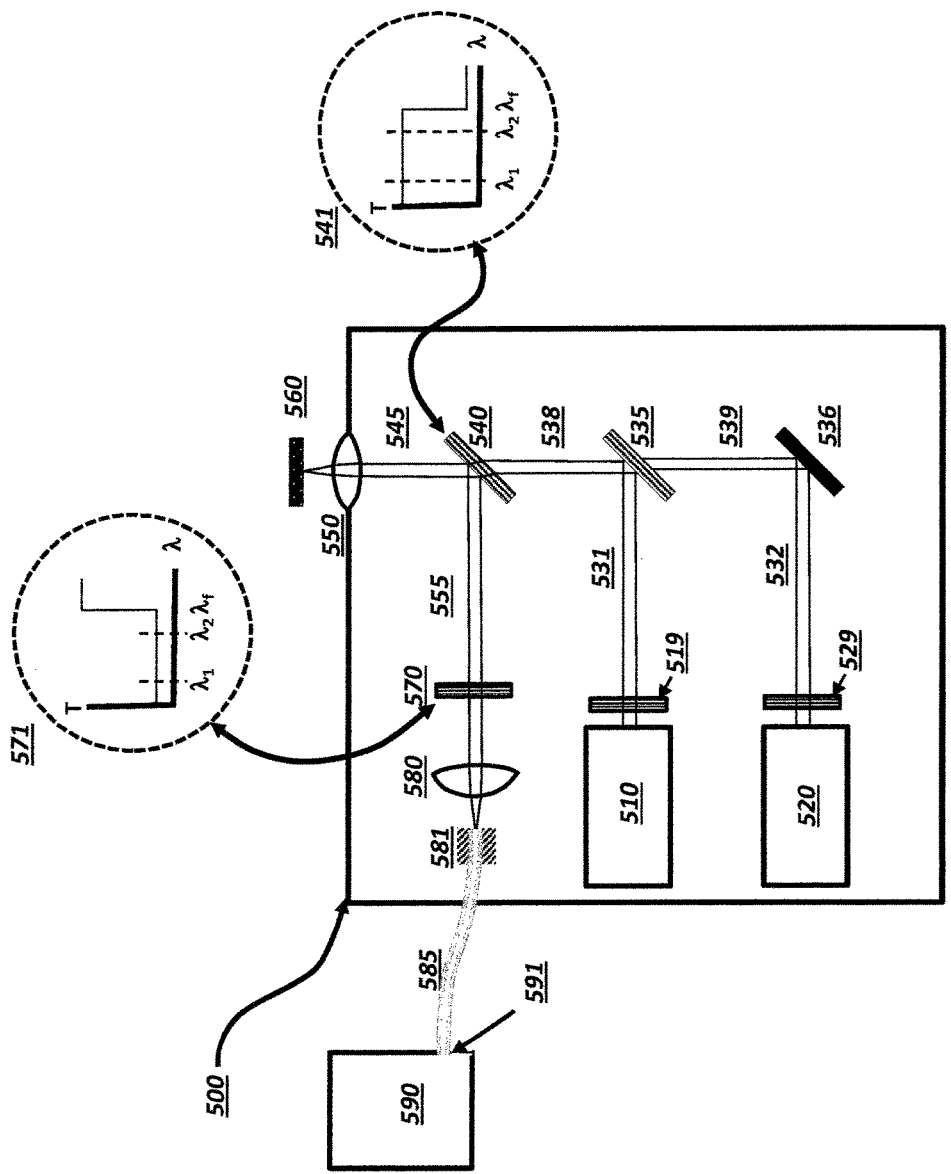
FIG. 6 illustrates a block diagram of an exemplary embodiment of the dual-wavelength Raman probe using internal laser sources according to the principles of the invention.

FIG. 6 illustrates a second exemplary embodiment of a compact dual-wavelength Raman probe, in accordance with the principles of the invention. In this second exemplary embodiment laser sources 510 and 520 are integrated within the housing 500. The laser sources 510 and 520 are exemplarily shown as emitting collimated free-space output beams. Other configurations including use of fiber-coupled laser sources with beam shaping optics corresponding to those shown in FIG. 5 are possible. All other components shown in FIG. 6 have the same function and design as the corresponding components shown in FIG. 5 and need not be discussed in further detail.

FIG. 7 is an expanded view of the inset 571 of FIG. 5 and shows the transmission of the Stokes-shifted spectra through filter 570 illustrating a key aspect of the compact dual-wavelength Raman probe and method for detecting the Raman signals. In this illustrative example, both the fingerprint region of the spectrum arising from excitation by a first selected (e.g., 785 nm) light and the stretch region of the spectrum arising from excitation by a second selected (e.g. 680 nm) light are diffracted by the spectrometer grating to fall within substantially overlapping wavelengths at the detector array. Thus, both the fingerprint and stretch regions can be detected by a single detector array.

The fingerprint and stretch regions are detected and processed sequentially to allow construction of a single display of the Raman spectrum comprising both components.

The compact dual-wavelength Raman probes of FIGS. 5 and 6 can be modified to generate anti-Stokes-shifted Raman spectra by using a high-pass filter 570 instead of the low-pass filter used for providing Stokes spectra.

Figure 8:
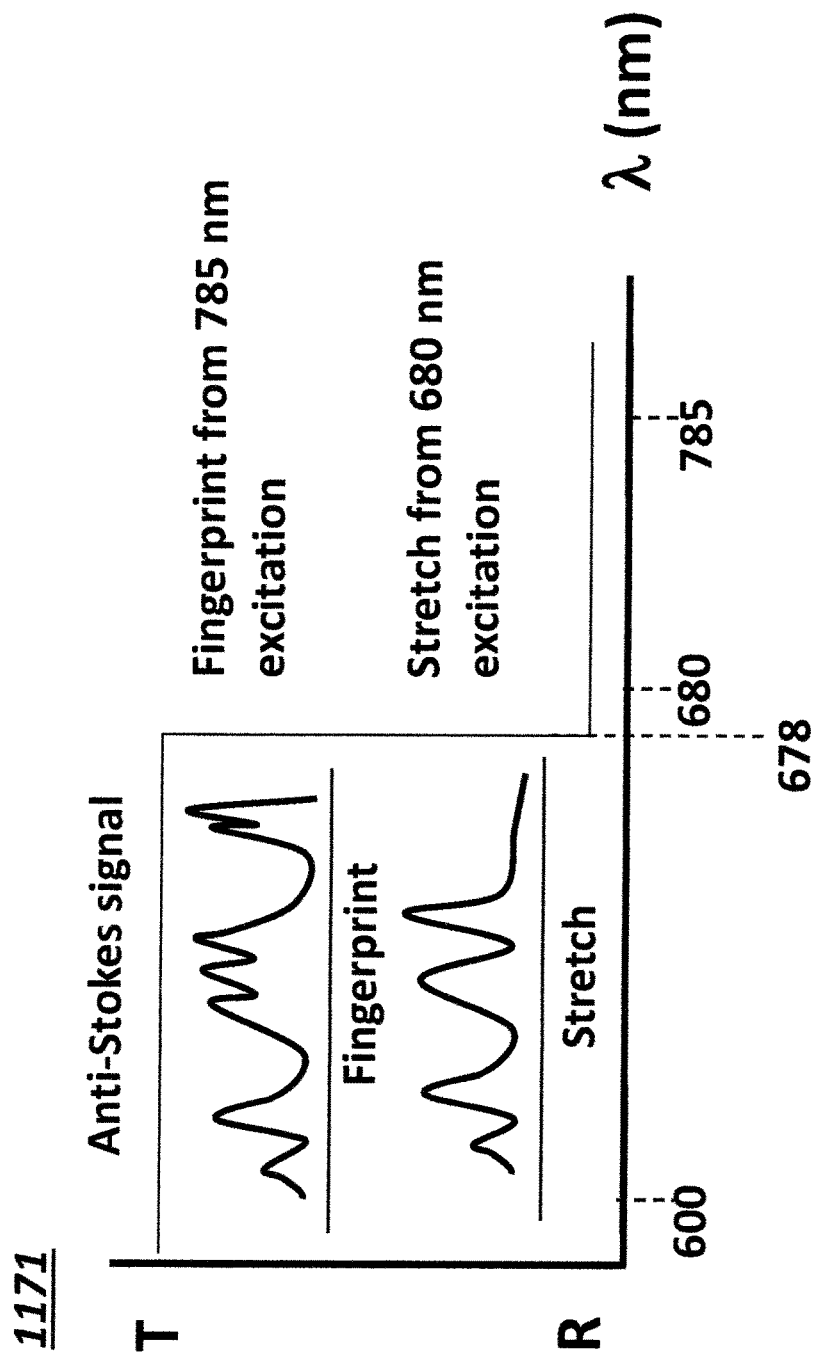
FIG. 8 illustrates the transmission profile of a short-pass filter having a cut-off wavelength of 678 nm and exemplary fingerprint and stretch region anti-Stokes-shifted Raman signal data.

FIG. 8 illustrates the fingerprint and stretch anti-Stokes spectral components arising from the 785 nm and 680 nm excitation light, respectively. The fingerprint and stretch spectra substantially overlap—as is the case of the previously described Stokes spectra—but now at shorter wavelengths than the excitation light. This embodiment may be particularly useful for detecting anti-Stokes spectra when one or more of the probe lasers is operating at wavelengths longer than the responsivity maximum of Si detectors e.g. at 1064 nm.

Figure 9:
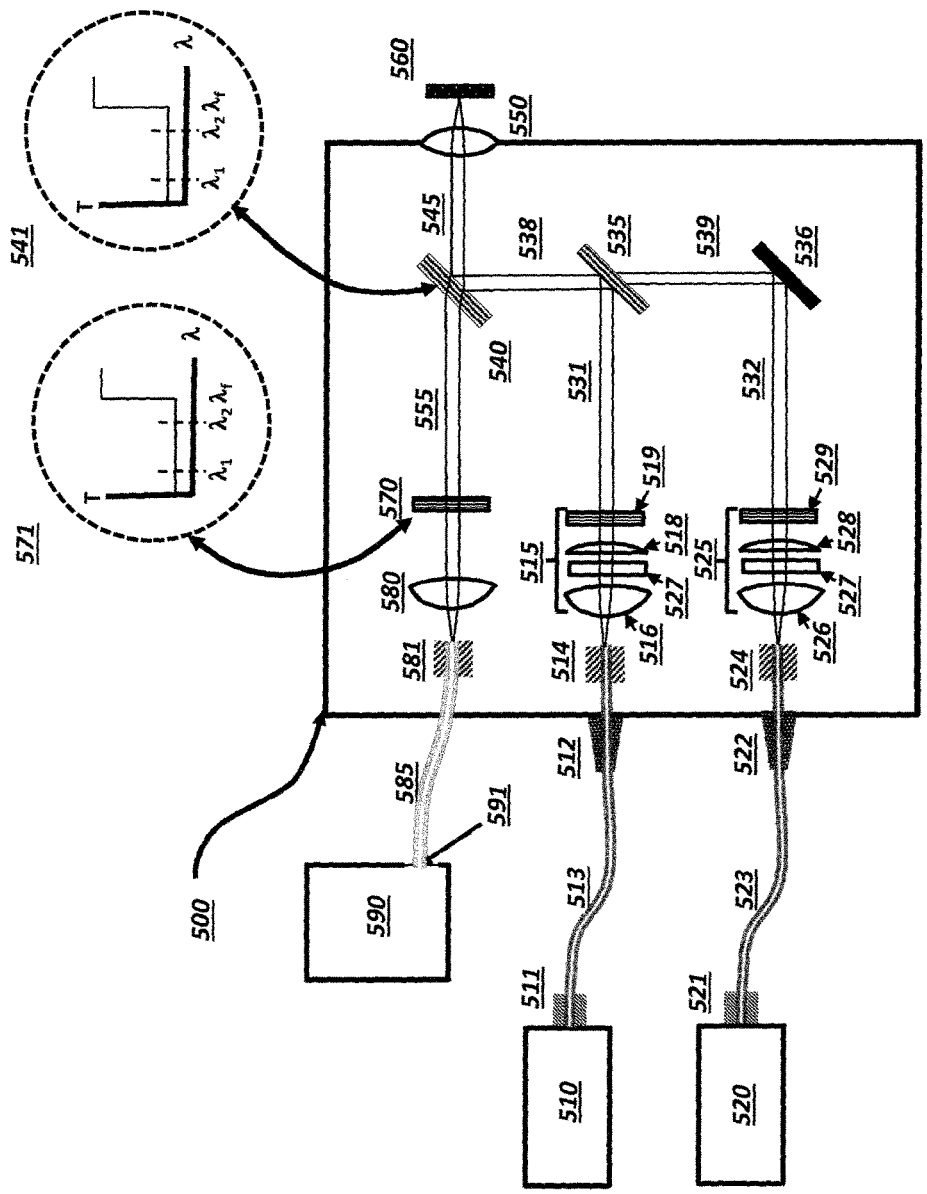
FIG. 9 illustrates a block diagram of an exemplary embodiment of the dual-wavelength Raman probe using external laser sources according to the principles of the invention.
Figure 10:
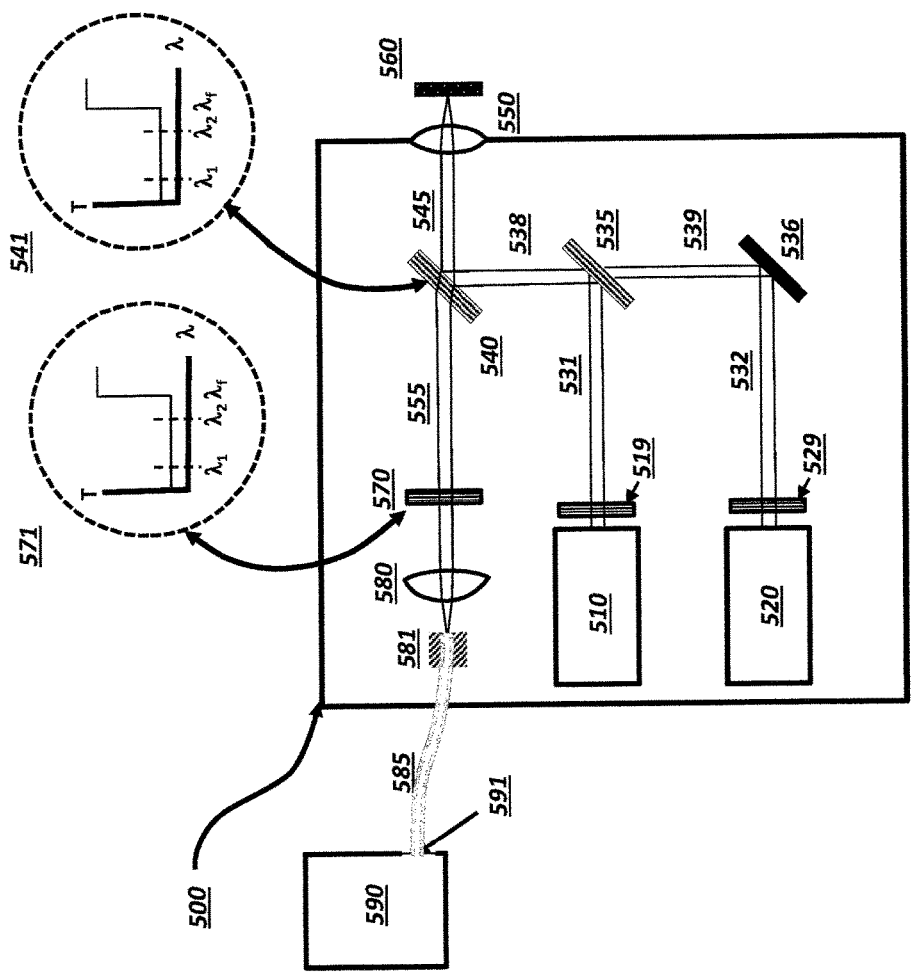
FIG. 10 illustrates a block diagram of an exemplary embodiment of the dual-wavelength Raman probe using internal laser sources according to the principles of the invention.

FIGS. 9 and 10 illustrate further embodiments of compact dual-wavelength Raman probes in which the dichroic mirror 540 and filter 570, respectively, are designed to be substantially reflective at the excitation wavelengths and substantially transmissive at longer wavelengths for detection of Stokes spectra. As would be recognized, in embodiments of the compact dual-wavelength Raman probe the dichroic mirror 540 and filter 570 are designed to be substantially reflective at the excitation wavelengths and substantially transmissive at shorter wavelengths for detection of anti-Stokes spectra.

Figure 11:
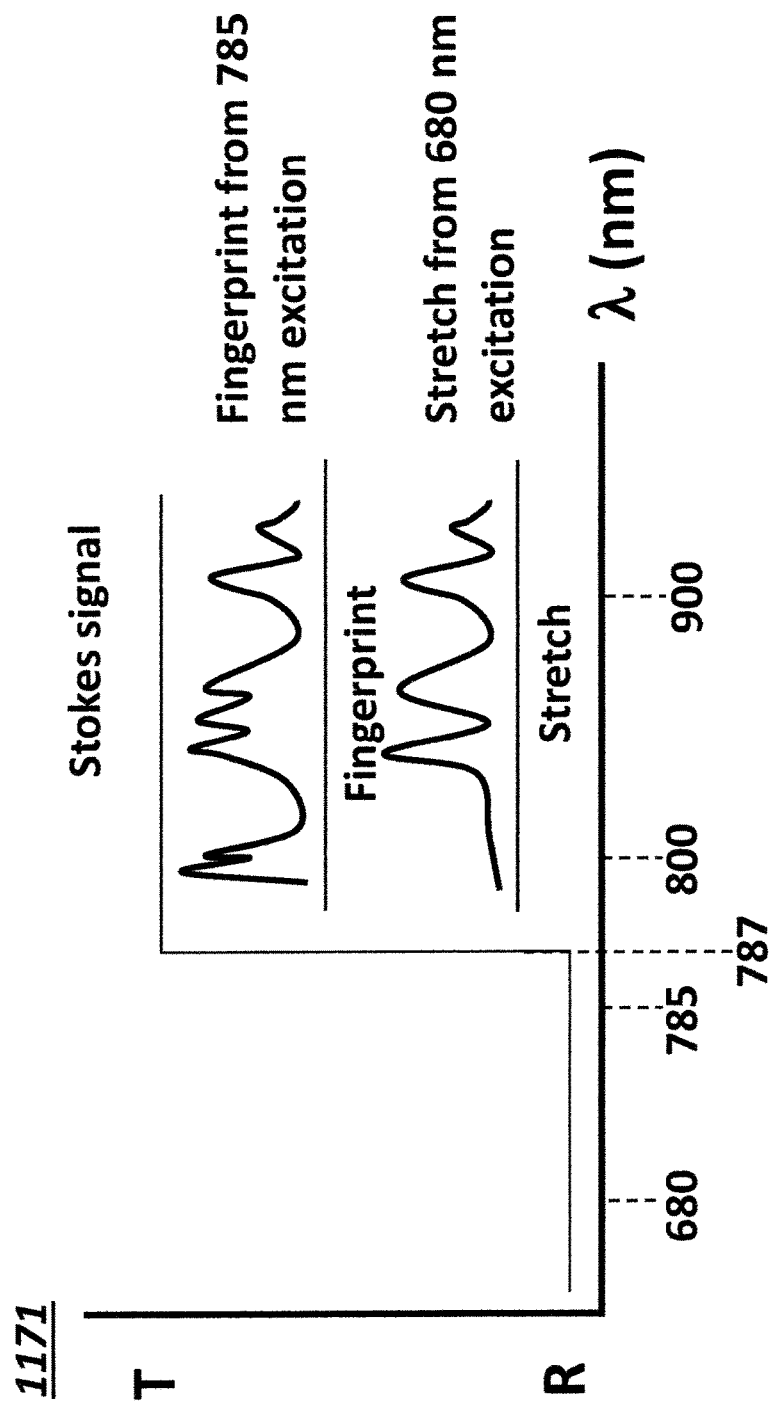
FIG. 11 illustrates the transmission profile of a long-pass filter having a cut-off wavelength of 787 nm and exemplary fingerprint and stretch region Stokes-shifted Raman signal data.
Figure 12:
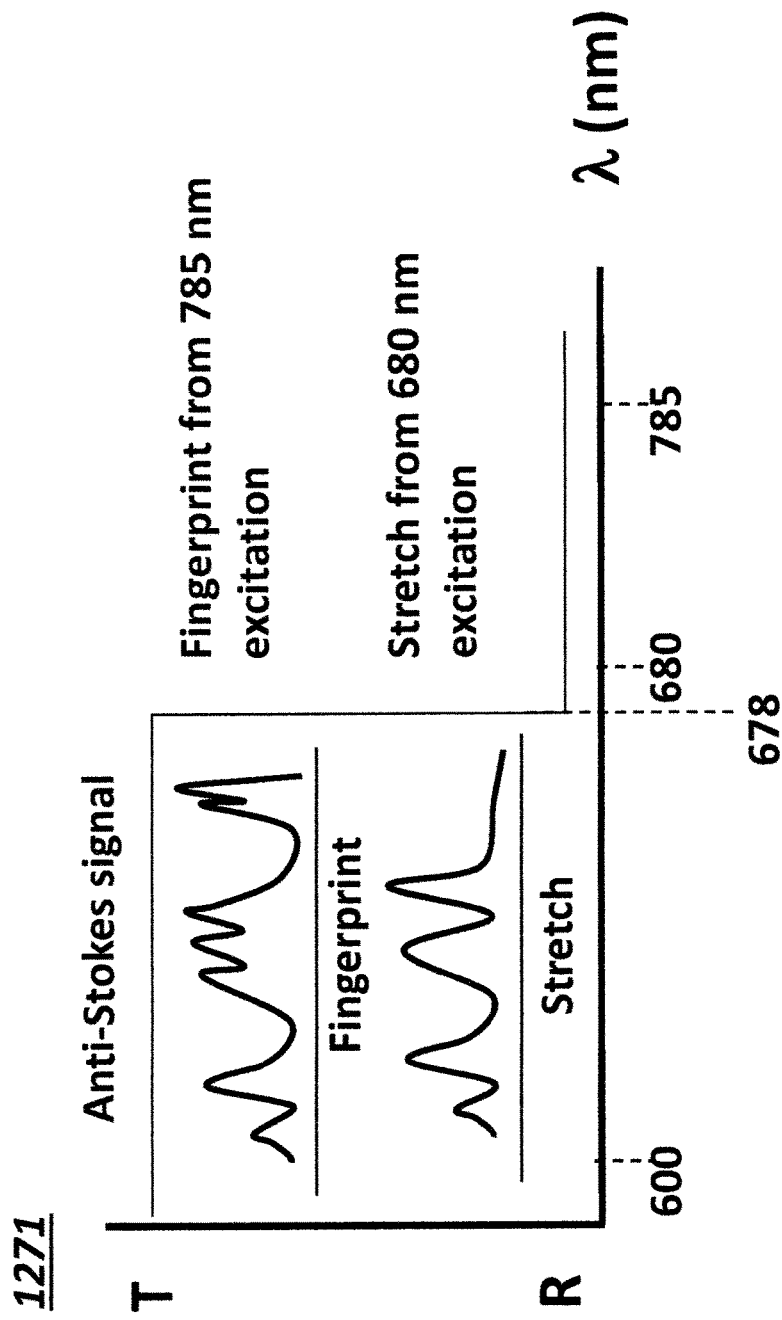
FIG. 12 illustrates the transmission profile of a short-pass filter having a cut-off wavelength of 678 nm and exemplary fingerprint and stretch region anti-Stokes-shifted Raman signal data.

The transmission characteristics of filter 570 are shown in FIG. 11 for detection of Stokes spectra and in FIG. 12 for anti-Stokes spectra.

Figure 13:
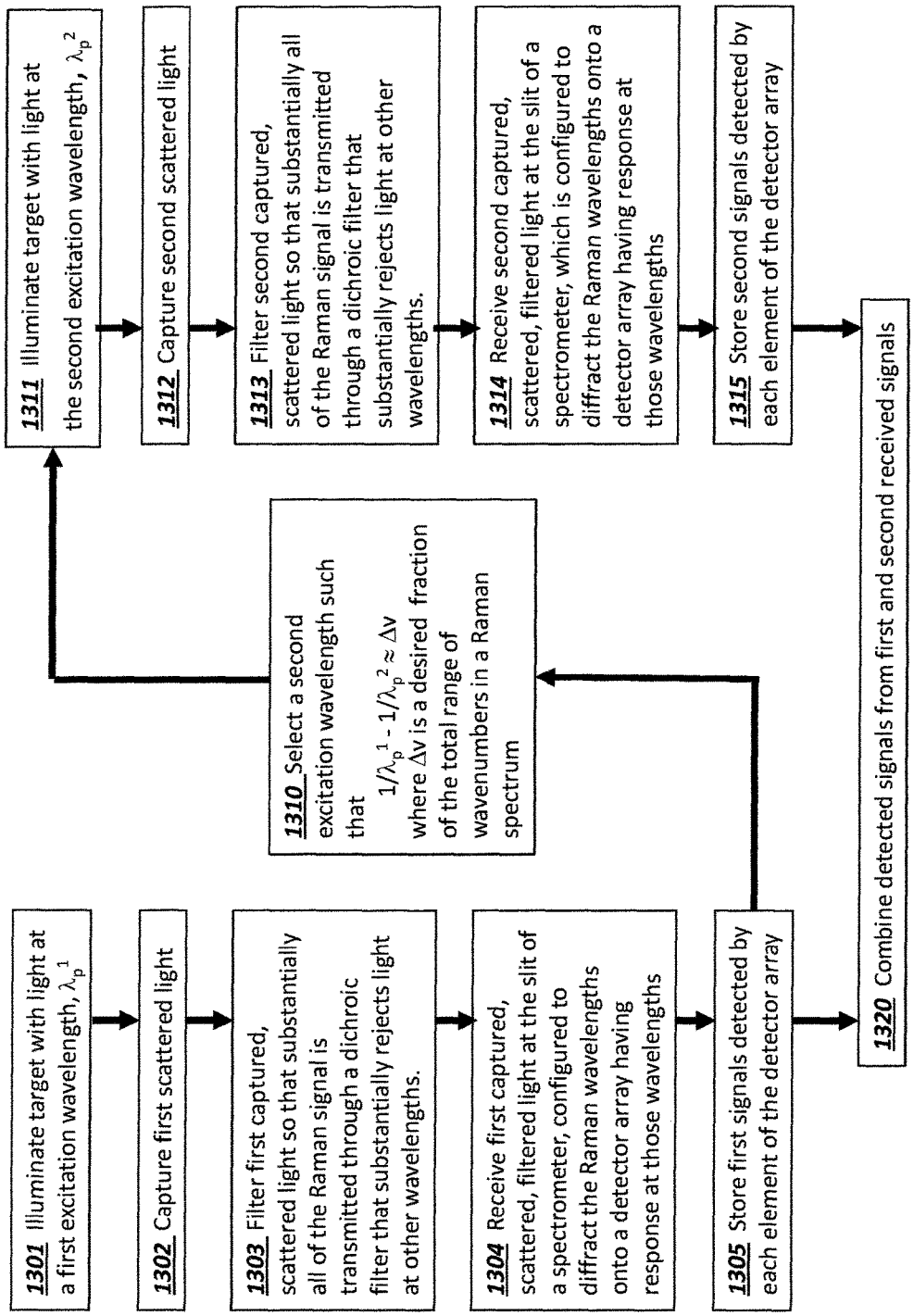
FIG. 13 illustrates an exemplary method for capturing Raman signals by sequential excitation of two probe wavelengths and combining the two captured spectral components into a single spectrum.

FIG. 13 illustrates an exemplary method for capturing Raman signals by sequential excitation of two probe wavelengths and combining the two captured spectral components into a single spectrum.

As shown, the target is first illuminated with a first excitation light from a first laser source 1301 and a portion of the Raman spectrum corresponding to the first excitation wavelength, incident on elements of the detector array, is detected 1302. Data corresponding to the light intensity, as a function of element location, is stored in a memory. The target is then illuminated with a second excitation light from a second laser source 1311 and a portion of the Raman spectrum corresponding to the second excitation wavelength incident on elements of the detector array is detected 1312. Data corresponding to the light intensity, as a function of element location, is stored in a memory.

The data representing the first and second portions of the Raman spectrum are then combined 1320 to yield a single Raman spectrum covering the entire range of wavenumbers of interest.

In one aspect of the invention, each spectrum of the first and second Raman spectra are processed to "baseline" by removing fluorescence from the spectra. The resultant spectra of each of the first and second Raman spectrum are then normalized with respect to the small region, Δv, (e.g., 2000 cm$^{-1}$) where spectra are collected from both the first and second lasers. After normalization, the two spectra may be combined or mated with regard to the overlapping spectrum region.

Figure 14:
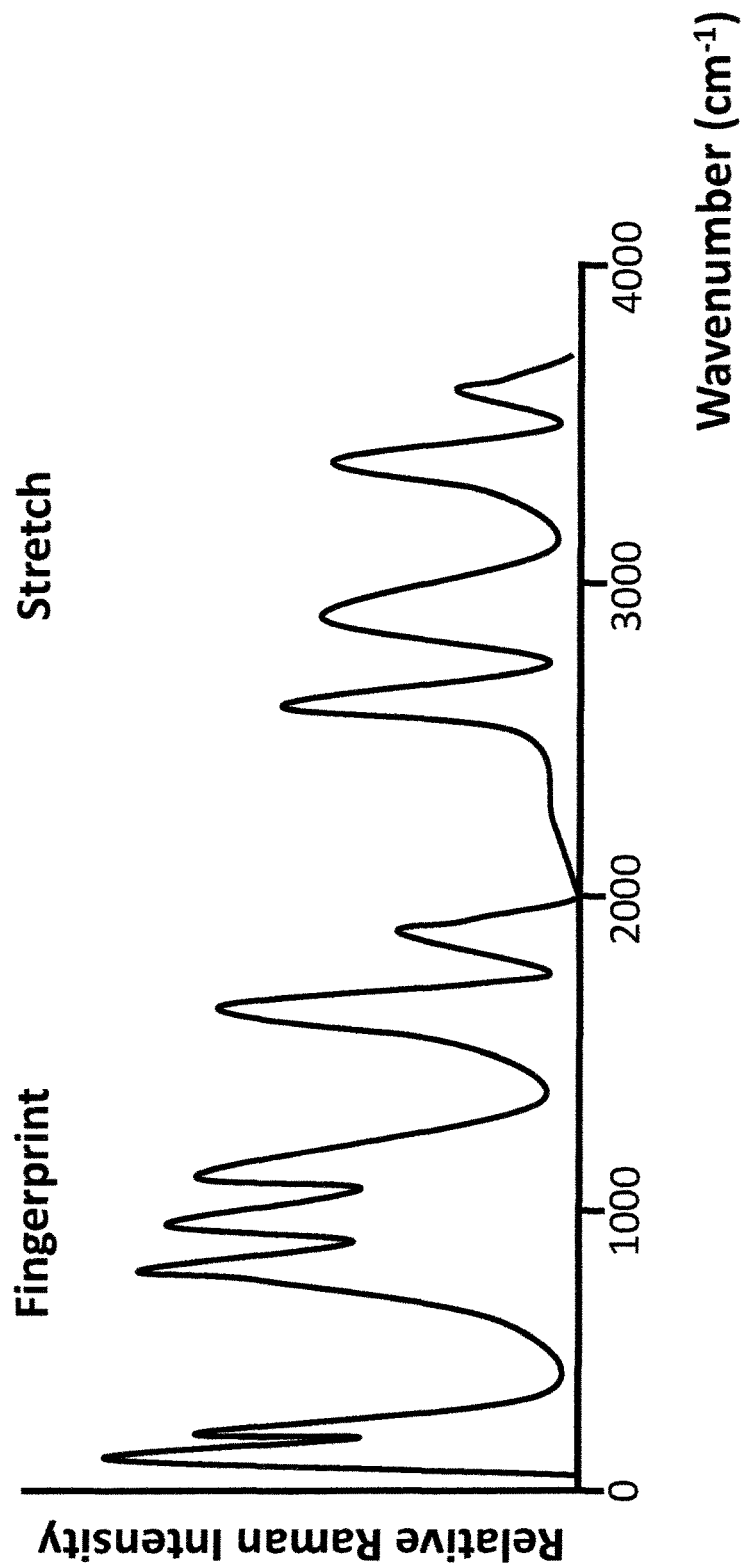
FIG. 14 illustrates display of an exemplary combined spectrum obtained by the method of FIG. 13.

FIG. 14 illustrates a display of an exemplary combined spectrum obtained by the method of FIG. 13. Either Stokes or anti-Stokes Raman signals may be used. The data representing the fingerprint and stretch components of the spectrum in this figure correspond to that acquired as shown in FIG. 7 or 8. A first spectral component is excited, captured, filtered, received and stored as shown in steps 1301, 1302, 1303, 1304, and 1305, respectively. Subsequently, a second component is excited, captured, filtered, received and stored as shown in steps 1311, 1312, 1313, 1314, and 1315, respectively. The first and second spectral component data are then concatenated, or combined together, in step 1320, which can be displayed as shown in FIG. 14. The exemplary combined spectrum may be obtained using 680 nm and 785 nm wavelengths indicated in FIG. 7 or 8 or any other set of wavelengths that allows corresponding fingerprint and stretch portions of the Raman spectrum to substantially overlap on the detector of the receiving spectrometer.

The dual-laser Raman Probe described herein enable opportunities to use the water band as an embedded calibration standard in some applications. For example, to monitor a pharmaceutical bioreactor (a sealed vessel in which bacteria are grown in an aqueous liquid), the OH stretch band can be used as a calibration standard against which CH and NH stretch bands change as proteins are generated by the bacteria and food (carbohydrates) are consumed. Another exemplary use in titration, whereby the concentration of an additive can be determined by calibration using the Raman signal of pure water. Also, due to the enhancement of the stretch band signal, this entire region can be used as either additional data as input for chemometrics algorithms or as an orthogonal data to validate of data from the fingerprint region. The Raman concatenation method and systems described herein may also have use in medical diagnostics because fats and proteins can be monitored using the CH and NH bands and water using the OH band water. Such results can help diagnose inflammation or other pathological conditions. These systems and techniques can also be used in pharmaceutical process analytics because, for compounds grown in H$_2$O, near-infrared (NIR) spectroscopy is not effective. Also, this approach can be used to analyze petrochemicals as CH bands are important and where water is generally a contaminant.

In accordance with the principles of the invention, the excitation lasers of the Raman Probe may be operated simultaneously or sequentially. Sequential operation eliminates spurious signals e.g. fluorescence, that may be excited by a laser source emitting at one wavelength if Raman data is being generated and detected by the other laser source if both sources were to be operated simultaneously.

In accordance with the principles of the invention, a dual wavelength Raman Probe is disclosed that provides for collection of Stokes and anti-Stokes spectrums, which is stitched together to provide a single spectral scan encompassing the entire range of data, including the fingerprint and stretch regions. The dual wavelength Raman Probe disclosed selects the transmission wavelengths to satisfy $$1/\lambda_p^1 - 1/\lambda_p^2 \approx \Delta v$$

Although the invention has been described with regard to "a wavelength" emitted by the laser source or operated on by the Raman and Rayleigh scattering, it would be recognized that the term "a wavelength" is a term of art and refers to a wavelength or a band of wavelengths around a nominal desired wavelength. The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention. Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A Raman probe apparatus comprising:
   a first laser source emitting a first laser light at a first Raman excitation wavelength;
   a second laser source emitting a second laser light at a second Raman excitation wavelength;
      wherein said first Raman excitation wavelength, $\lambda_p^1$, and said second Raman excitation wavelength, $\lambda_p^2$ are related as:

$$1/\lambda_p^1 - 1/\lambda_p^2 \approx \Delta v,$$

where $\Delta v$ is a desired fraction of the total range of wavenumbers in a Raman spectrum;
   a housing comprising:
      a first dichroic mirror configured to:
         combine the laser light of the first Raman excitation wavelength with the laser light of the second Raman excitation wavelength into a single combined Raman excitation light beam;
      a second dichroic mirror configured to:
         receive the single combined Raman excitation light beam;
         transmit said single combined Raman excitation light beam, and
         reflect wavelengths different than the wavelengths of the single combined Raman excitation light beam;
      focusing optics configured to:
         receive said Raman excitation light beam being transmitted in said single combined beam light path, and
         focus said Raman excitation light beam onto a target of interest:
         collect light scattered from said target of interest; and
         direct said collected scattered light back towards said second dichroic mirror;
      a filter configured to:
         receive said collected scattered light from said second dichroic mirror,
         transmit, from the collected scatter light, wavelengths other than the first Raman excitation wavelength and said second Raman excitation wavelength, and
      an optical fiber configured to:
         receive the filtered collected scattered light transmitted through said filter, and
         transmit the filtered collected scattered light to a spectrometer.

2. The apparatus of claim 1, wherein said filter is configured to:
   transmit wavelengths longer than said first Raman excitation wavelength and said second Raman excitation wavelength; and
   block said first Raman excitation wavelength and said second Raman excitation wavelength and wavelengths shorter than said first Raman excitation wavelength and said second Raman excitation wavelength.

3. The apparatus of claim 1, wherein said filter is configured to:
   transmit wavelengths shorter than wavelengths of said Raman excitation light beam; and block at least as long as wavelengths of said Raman excitation light beam.

4. The apparatus of claim 1, wherein said filter is one of: a dichroic filter, a volume holographic grating filter, and a fiber Bragg grating filter.

5. The apparatus of claim 1, wherein at least one of the first laser source and the second laser source is external to said housing.

6. The apparatus of claim 5, wherein the first light of the first laser source and the second light of the second laser source are combined external to said housing.

7. The apparatus of claim 1, wherein at least one of the first laser source and the second laser source are internal to said housing.

8. The apparatus of claim 1, wherein at least one of the first laser source and the second laser source is one of: a multi-spatial mode laser and a single-spatial mode laser.

9. A Raman probe apparatus comprising:
 a first laser source configured to:
  emit a first laser light at a first Raman excitation wavelength;
 a second laser source configured to:
  emit a second laser light at a second Raman excitation wavelength;
  wherein said first Raman excitation wavelength, $\lambda_p^1$, and said second Raman excitation wavelength, $\lambda_p^2$ are related by, $1/\lambda_p^1 - 1/\lambda_{op}^2 \approx \Delta v$,
  where $\Delta v$ is a desired fraction of the total range of wavenumbers in a Raman spectrum;
 a housing comprising:
  a first dichroic mirror configured to:
   combine the first laser light and the second laser light into a combined laser light beam;
  a second dichroic mirror configured to:
   receive the combined laser light beam;
   reflect said combined laser beam; and
   transmit wavelengths different than the wavelengths of the combined laser beam;
  focusing optics configured to:
   receive said combined light beam;
   focus said combined light beam onto a target of interest;
   collect light scattered from said target of interest; and
   direct said collected scattered light towards said second dichroic mirror;
  a filter configured to:
   receive said collected scattered light from said second dichroic mirror; and
   block said first Raman excitation wavelength and said second Raman excitation wavelength from the collected scattered light; and
  an optical fiber configured to:
   receive the filtered collected scattered light transmitted through said filter; and
   transmit the received filtered collected scattered light to a spectrometer.

10. The apparatus of claim 9, wherein said filter is configured to:
 transmit wavelengths longer than said first Raman excitation wavelength and said second Raman excitation wavelengths; and
 block wavelengths shorter that said first Raman excitation wavelength and said second Raman excitation wavelength.

11. The apparatus of claim 9, wherein said filter is configured to:
 transmit wavelengths shorter than said first Raman excitation wavelength and second Raman excitation wavelength; and
 block wavelengths at least longer that than said first excitation wavelength and said second Raman excitation wavelength.

12. The apparatus of claim 9, wherein said filter is one of: a dichroic filter, a volume holographic grating filter, and a fiber Bragg grating filter.

13. The apparatus of claim 9, wherein at least one said first laser source and said second laser source is external to said housing.

14. The apparatus of claim 13, wherein the light of the first laser source and the light of the second laser source are combined external to said housing.

15. The apparatus of claim 9, wherein at least one of the first laser source and the second laser source is internal to said housing.

16. The apparatus of claim 9, wherein said optical fiber is attached to one of: an interior of said housing and an exterior of said housing.

17. The apparatus of claim 9, wherein at least one of the first laser source and the second laser source is one of: a multi-spatial mode laser and a single-spatial mode laser.

18. A Raman probe comprising:
 first and second wavelength-stabilized laser diodes, each configured to:
  output a laser light comprising at least a corresponding Raman excitation wavelength;
  wherein the laser light associated with the first laser diode is transmitted at a wavelength, $\lambda_p^1$, and the laser light associated with the second laser diode is transmitted at a wavelength, $\lambda_p^2$, wherein $1/\lambda_p^1 - 1/\lambda_p^2 \approx \Delta V$,
  where $\Delta v$ is a desired fraction of the total range of wavenumbers in a Raman spectrum;
 a first dichroic mirror configured to:
  receive said first laser light and second laser light; and
  determine a combined beam through which at least one of: said first laser light and second laser light may be transmitted;
 a second dichroic mirror configured to:
  direct said at least one of: said first laser and second laser light being transmitted in the combined beam toward a target of interest;
  receive light scattered from said target of interest; and
  direct wavelengths of the received light that include Raman-shifted wavelengths towards a spectrometer;
  direct wavelengths other than wavelengths included in the Raman-shifted spectrum away from said spectrometer;
 a focus means configured to:
  receive said combined beam;
  focus said light of the combined beam onto said target of interest; and
  collect light scattered by said target of interest;
 a filter configured to:
  filter said light scattered by said target of interest, said filtering comprising:
   removing at least said Raman excitation wavelength of said first laser and said Raman excitation wavelength of second laser from said light scattered by said target of interest; and
 an optical fiber configured to:
  received said filtered collected scattered light; and
  transmit the filtered collected scattered light to said spectrometer.

19. The Raman probe of claim 18, wherein at least one of the first and the second wavelength-stabilized laser diodes is internal to the Raman probe.

20. The Raman probe of claim 18, wherein at least one of the first and the second wavelength-stabilized laser diode is external to the Raman probe.

21. The Raman probe of claim 18, wherein said filter is at least one of: a notch filter, a low pass filter and a high pass filter.

22. The Raman probe of claim 18, wherein said second dichroic mirror is at least one of: a low pass filter and a high pass filter.

23. A method of combining components of a Raman spectrum, said method comprising:
   providing a light at a first Raman excitation wavelength and a light at a second Raman excitation wavelength, wherein said first Raman excitation wavelength, $\lambda_p^1$, and said second Raman excitation wavelength, $\lambda_p^2$ are related as $1/\lambda_p^1 - 1/\lambda_p^2 = \Delta v$,
      where $\Delta v$ is a desired fraction of the total range of wavenumbers in a Raman spectrum;
   combining said light at said first Raman excitation wavelength and said light at said second Raman excitation wavelength;
   directing said combined light towards a target of interest;
   collecting scattered light from said target of interest;
   filtering said collected scattered light to remove at least said first Raman excitation wavelength and said second Raman excitation wavelength from said light scattered by said target of interest;
   detecting first Raman-shifted signals within the collected scattered light using a detector array;
   storing said first Raman-shifted signals in a memory;
   detecting second Raman-shifted signals produced within the collected scattered light using said detector array;
   storing said second Raman-shifted signals in a memory; and
   combining said first Raman-shifted signal and second Raman-shift signal to form a combined Raman spectrum, wherein said combining comprises:
      generating a resultant first Raman-shifted signal and a resultant second Raman-shifted signal by removing fluorescence from each of the stored first and second Raman-shifted signals;
      normalizing each of the resultant first Raman-shifted signal and second Raman-shifted signal in the region $\Delta v$; and
      combine the normalized resultant first Raman-shifted signal and second Raman-shifted signals.

24. The method of claim 23 wherein said first Raman-shifted signal and second Raman-shifted signal are one of: Stokes-shifted and anti-Stokes-shifted Raman signals.

25. The Raman probe of claim 1, wherein said filter is at least one of: a notch filter, a low pass filter and a high pass filter.

26. The Raman probe of claim 9, wherein said filter is at least one of: a notch filter, a low pass filter and a high pass filter.

* * * * *